United States Patent [19]
Froehlich

[11] Patent Number: 5,791,677
[45] Date of Patent: Aug. 11, 1998

[54] HITCH COVER

[76] Inventor: Barry D. Froehlich, 323 W. 2nd St., McClusky, N. Dak. 58463

[21] Appl. No.: 639,116

[22] Filed: Apr. 24, 1996

[51] Int. Cl.⁶ .................................................. B60D 1/01
[52] U.S. Cl. ........................ 280/507; 150/166; D12/162
[58] Field of Search ........................... 280/507, 504, 280/511; 150/154, 166; D12/162

[56] References Cited

U.S. PATENT DOCUMENTS

| | | | |
|---|---|---|---|
| 2,440,744 | 5/1948 | Grinnell et al. | 280/507 |
| 2,641,124 | 6/1953 | Gallagher et al. | 280/507 |
| 2,656,706 | 10/1953 | Lucas et al. | 280/507 |
| 5,037,122 | 8/1991 | Beckerer, Jr. | 280/507 |
| 5,533,743 | 7/1996 | Bello | 280/507 |
| 5,536,031 | 7/1996 | Hurley | 280/507 |

FOREIGN PATENT DOCUMENTS

| | | | |
|---|---|---|---|
| 2097306 | 3/1972 | France | 280/507 |

*Primary Examiner*—Scott Cummings
*Attorney, Agent, or Firm*—Schwegman, Lundberg, Woessner & Kluth, P.A.

[57] ABSTRACT

A hitch cover for preventing injury to individuals moving within the area located beneath the overhang portion of a fifth-wheel type camper trailer, the hitch cover including a cover member of an oversized solid one-piece foam rubber construction having a blind hole in the top surface for receiving therein the depending hitch pin for mounting the cover member on the hitch pin with the cover member underlying the bottom of the hitch pin support, the outer diameter of the cover member being sufficiently large as to permit the cover member to extend radially outward with its peripheral edge located beyond the front and sides of the hitch pin support, thus preventing direct contact with the hitch pin and/or the hitch pin support by an individual, such as a child, when moving within the area beneath the overhang pin and/or the hitch pin support.

17 Claims, 4 Drawing Sheets

HITCH COVER

FIELD OF THE INVENTION

The present invention relates to trailer hitch covers, and more particularly, to a protective cover for the hitch portion of a fifth-wheel type camper trailer, and the like, for preventing injury to an individual by cushioning a blow from accidental contact with the hitch pin support and/or the hitch pin that projects vertically downward from the hitch bar.

BACKGROUND OF THE INVENTION

The hitch portion of a fifth-wheel type camper trailer is mounted on the lower surface of an overhang portion of the camper trailer to facilitate connecting the camper trailer to a drive vehicle, which is typically a pick-up truck. The hitch assembly projects vertically downward from the bottom of the trailer overhang to permit the hitch pin to be received in a fifth-wheel connector located at the rear of the drive vehicle.

When a fifth-wheel type camper trailer is unhooked from its drive vehicle and parked, the hitch bar and the hitch pin of the trailer hitch portion are exposed at the bottom of the overhang, typically at a height of about four feet above ground level. Consequently, the hitch assembly of an unhooked and parked fifth-wheel trailer represents a risk of serious head injuries to anyone moving within the area beneath the overhang. Children engrossed in play are especially vulnerable, and younger children in particular are most susceptible to this type of injury because of their height. Adults are subject to head injuries when loading and unloading this storage area due to the storage area in the lower front of the RV camper.

Although trailer hitch covers have been disclosed in the prior art, known trailer hitch covers have been intended for use with bumper type trailer hitches and are designed primarily to protect the ball portion of the bumper type hitch. For example, U.S. Pat. No. 4,181,320, which was issued to Walter H. Wellborn, Jr., discloses a protective cover for a ball type trailer hitch. The protective cover is a hollow, thin-walled member defining a cavity therein for receiving the ball portion of the hitch. The cover has a small opening in the base thereof to permit the ball portion to be received in the cover. The diameter of the opening is smaller than the diameter of the hitch ball and flexible tabs or fingers are provided in the base of the cover to permit the ball portion to pass through the opening. The flexible tabs retain the cover on the hitch ball by engaging the neck of the hitch below the ball. The protective cover, which is intended to protect the trailer hitch ball from damage, is made of a rigid plastic, and as such, would not appear to be particularly suitable for preventing injury to an individually coming into contact with the cover while it is installed on a bumper type hitch. Moreover, no provision is made for guarding against injury as the result of accidental contact with the hitch bar.

U.S. Pat. No. 3,596,926, which was issued to Richard R. Randall, discloses a trailer hitch protective cover including a cup shaped hitch ball cover retaining a soft absorbent material impregnated with lubricant therein. The cover is tethered to a portion of the vehicle or trailer and has a magnet attached thereto for retaining the cover to the vehicle or trailer when the cover is not in use. The cover also has a cap attached thereto for closing off the hitch ball opening when not in use. This hitch cover is designed to protect the hitch ball rather than prevent injury to individuals, as evidenced, for example, by the cover being comprised of a rigid outer layer, to facilitate attachment of the tether and magnet, with flexible material being provided only on the inside of the cover. Moreover, the cover does not provide protection from contact with the hitch bar.

In U.S. Pat. No. 5,037,122, which was issued to Frank S. Bickerer, Jr. there is disclosed a safety cover for a trailer hitch having a hitch ball which extends vertically upwards from a hitch bar. The safety cover includes a base portion and an integral upstanding hollow dome portion molded of plastic or rubber. The base portion defines a cavity for receiving and enclosing the distal end of the hitch pin support therein and includes yieldable internal ribs which retain the cover on the itch pin support. The dome portion is designed to receive the hitch ball therein and defines a headspace above the hitch ball for trapping air to prevent complete collapsing of the sidewall portion of the dome in response to a blow from direct contact with the hitch pin support or with the hitch ball.

These prior art hitch covers are intended for use on bumper type hitches, in which applications the hitch assembly is located approximately at knee height and within the line of sight of individuals approaching the vehicle. In contrast, the hitch assemblies for fifth-wheel type trailers are located within a confined area beneath the overhang of the trailer, and generally are mounted above eye level. Moreover, the hitch pin supports of bumper type hitch assemblies project outwardly from the vehicle on which they are mounted only a few inches, and the ball portion of the hitch overlies the distal end of the hitch pin support. In contrast, hitch pin supports of the hitch portions of fifth-wheel type trailers typically project several feet in a generally horizontal direction along the undersurface of the overhang on which they are mounted.

For the reasons stated above, and for other reasons stated below which will become apparent to those skilled in the art upon reading and understanding the present specification, there is a need in the art for a hitch cover for the hitch portion of a fifth-wheel type camper trailer and the like, and which prevents injury to individuals, and especially to younger children, as may be caused by accidental contact with the hitch portion of a fifth-wheel type camper trailer and the like.

SUMMARY OF THE INVENTION

The present invention provides a hitch cover for the hitch assembly of a fifth-wheel type camper trailer, and the like, for preventing injury to an individual who accidentally bumps into the hitch portion of the trailer. The hitch cover is particularly suitable for use with trailer hitch portions of the type that include a hitch pin that projects downwardly from the bottom surface of the hitch pin support near the front surface of the hitch pin support.

In accordance with the invention, the hitch cover includes a cover member of a soft, resilient material. The upper surface of the cover member has an opening therein for receiving the hitch pin to permit the cover member to be installed on the hitch pin in underlying relation with the bottom surface of the hitch pin support. The opening includes a sidewall the inner dimension of which is less than the outer dimension of the hitch pin. A resilient annular collar, which projects inwardly from the sidewall in the opening, is adapted to be received in a reduced dimensioned portion of the hitch pin when the cover member is installed on the hitch pin. The depth of the opening is at least equal to the length of the hitch pin and is less than the thickness of the cover member between its upper and lower surfaces. Thus, when the cover member is installed on the hitch pin, the hitch pin is contained within the cover member, spaced inwardly from the lower surface of the cover member. In addition, when installed on the hitch pin, the cover member extends in underlying relation with the bottom surface of the hitch pin support and the peripheral edge portion of the cover member is located beyond the front surface and the side surfaces of the hitch pin support. Consequently, the cover member cushions a blow from accidental contact with either one of the hitch pin and the hitch pin support.

In accordance with one embodiment, the hitch cover comprises a solid, one-piece cover member which is generally toroidal in shape and which is made of foam rubber. The outer diameter of the hitch cover is sufficiently large that the peripheral edge portion of the cover member extends radially outward beyond the front and sides of the hitch pin support to prevent an individual from directly contacting the hitch pin support. In another embodiment, the cover member is a one-piece element is slit to define first and second engaging end portions which are relatively movable out of engagement with one another to provide access to the opening to facilitate mounting of the cover member on the hitch pin. In a further embodiment, the cover member comprises first and second cover member portions. Both these embodiments, include suitable securing means for holding together the two portions which comprise the cover member. In a further embodiment, the hitch cover comprises a cover member that is pivotally mounted on the hitch pin support and is adapted to be moved between a storage position in which the cover member rests on the upper surface of the hitch pin support, and a deployed position in which the cover member encloses the hitch pin.

DESCRIPTION OF THE PREFERRED EMBODIMENTS

In the following detailed description of the preferred embodiments, reference is made to the accompanying drawings which form a part hereof, and in which is shown by way of illustration specific preferred embodiments in which the inventions may be practiced. The preferred embodiments are described in sufficient detail to enable those skilled in the art to practice the invention, and it is to be understood that other embodiments may be utilized and that logical, changes may be made without departing from the spirit and scope of the present inventions. The following detailed description is, therefore, not to be taken in a limiting sense, and the scope of the present inventions is defined only by the appended claims.

Figure 1:
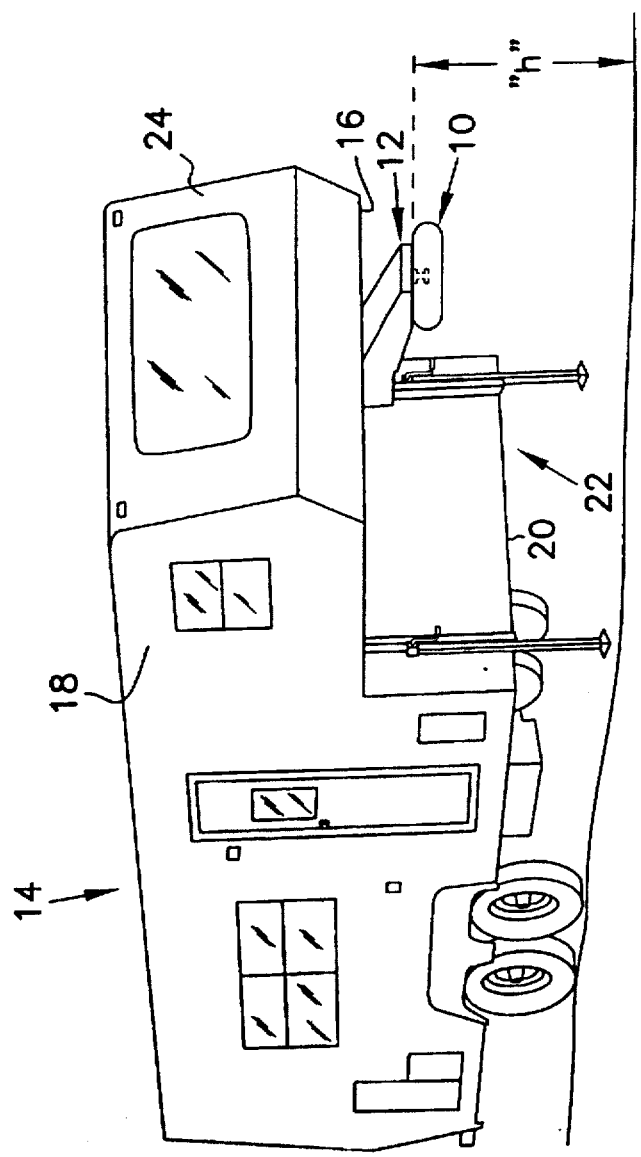
FIG. 1 is a view of a perspective view of a fifth-wheel camper having the hitch cover provided by the invention installed on the hitch pin of the camper.
Figure 2:
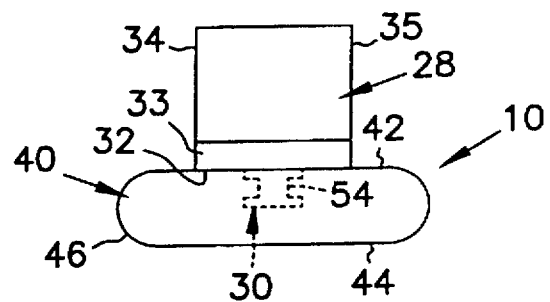
FIG. 2 is a front elevation view of the hitch pin support with the hitch cover installed on the hitch pin and with the cover member partially broken away to show the opening in the cover member.
Figure 3:
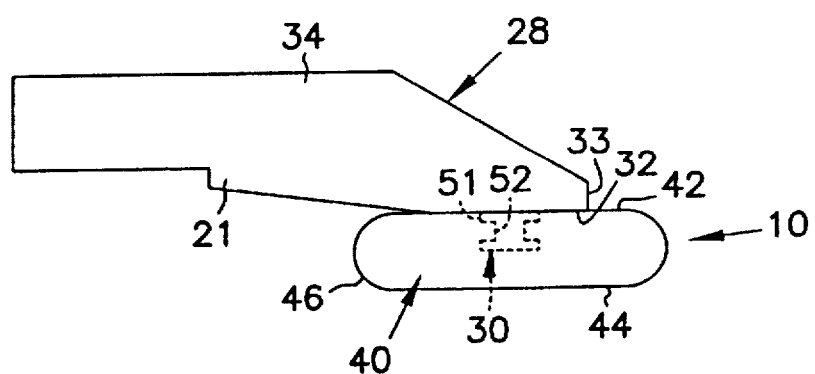
FIG. 3 is a side view of the hitch pin support with the hitch cover installed on the hitch pin.
Figure 4:
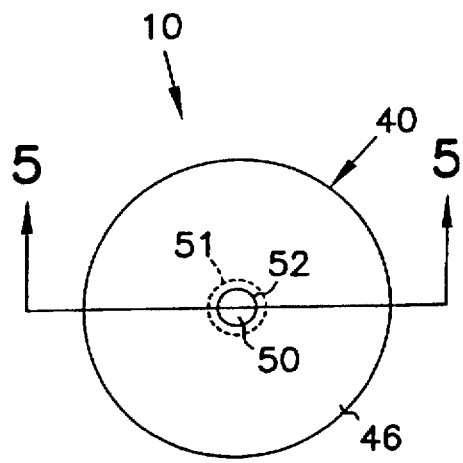
FIG. 4 is a top plan view of the hitch cover provided by the invention.
Figure 5:
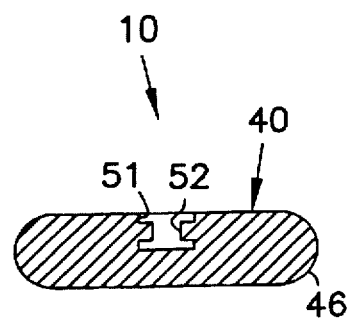
FIG. 5 is a vertical section view taken along the line 5—5 of FIG. 6.

Referring to FIGS. 1–3, the hitch cover 10 of the present invention is shown installed on the trailer hitch portion 12 of a fifth-wheel type camper trailer 14. The trailer hitch portion 12 of the camper trailer is mounted on the bottom surface 16 of an overhang portion 18 of the camper trailer for connecting the camper trailer to a drive vehicle (not shown), which is typically a pick-up truck. The bottom surface 16 of the overhang portion 18 is spaced upwards vertically from the bottom 20 of the body of the camper trailer 14, defining a space or area 22 at the front end 24 of the camper trailer which both facilitates connection to the fifth-wheel connector of the drive vehicle and permits the camper trailer to pivot about the fifth-wheel connector on the drive vehicle during turns.

The trailer hitch portion 12 is conventional and includes a hitch pin support 28 that projects forwardly along the bottom surface 16 of the overhang portion and a cylindrical hitch pin 30 that projects downwardly into the area 22 near the front of the hitch pin support. The hitch pin support has a generally horizontal bottom surface 32, a generally vertical front surface 33, a side surface 34 and side surface 35. The hitch pin support 28 presents a generally trapezoidal side profile, as viewed in FIG. 3, and is connected to the bottom surface 16 of the overhang portion 18 by a rearwardly extending portion 21 that extends upwardly at an angle relative to the horizontal from rear edge of the bottom surface 32. The hitch pin 30 depends from the bottom surface 32 of the hitch pin support near its front surface 33 and is centered between the side surfaces 34 and 35 of the hitch pin support.

When the camper trailer 14 is unhooked from its drive vehicle and parked, the hitch pin support 28 and the hitch pin 30 of the trailer hitch portion are exposed within the upper portion of the area 22 beneath the overhang portion 18. Typically, the trailer hitch portion 12, including the downwardly projecting hitch pin 30, is located at a height "h" of about four feet above ground level. Thus, the trailer hitch portion of an unhooked and parked fifth-wheel camper trailer presents a risk of serious head injuries to anyone moving within the area 22 below the overhang portion. Younger children are most susceptible to this type of injury because of their height.

The hitch cover 10 provided by the invention is adapted to be installed on the hitch pin 30 when the camper trailer is unhooked from its vehicle and parked. The hitch cover encloses the hitch pin and underlies the hitch pin support in such a way as to prevent injury to individuals who may bump into the hitch portion of a fifth-wheel type camper trailer when moving within the area 22 beneath the overhang portion 18. The hitch cover provided by the invention can be installed on the hitch pin readily and can be removed from the hitch pin quickly when the camper trailer is to be hitched to the drive vehicle.

More specifically, referring additionally to FIGS. 2–5, in one embodiment, the hitch cover 10 provided by the invention includes a cover member 40 made of a soft, resilient material. The cover member 40 is generally toroidal in shape and has an upper surface 42, a lower surface 44 and an annular peripheral edge portion 46. The upper and lower surfaces of the cover member extend in a generally parallel spaced-apart relation. The cover member 40 mounts on the hitch pin 30 in underlying relation with the bottom surface 32 of the hitch pin support. The outer diameter of the cover member 40 is greater than the length of the lower surface 32 of the hitch pin support and greater than the width of the front surface 33 of the hitch pin support. Thus, when mounted on the hitch pin, the cover member extends extend radially outward beyond the front and the sides of the trailer hitch pin support and the peripheral edge portion 46 of the cover member extends beyond both the front surface, as shown in FIG. 2, and the side surfaces of the hitch pin support 28, as shown in FIG. 3. Consequently, the cover member prevents direct contact by an individual with the distal end of the hitch pin support.

The upper surface 42 of the cover member has a blind hole or opening 50 formed therein for receiving the hitch pin when the cover member is installed on the hitch portion 12. The opening 50 is generally cylindrical in shape and has a sidewall 51, the inner diameter of which corresponds to the outer diameter of the hitch pin. The depth of the opening is at least equal to the length of the hitch pin and less than the thickness of the cover member between its upper and lower surfaces. In the exemplary embodiment, the depth of the opening is approximately one-half the thickness of the cover member between its upper and lower surfaces and is approximately twice the length of the hitch pin. Therefore, the hitch pin is completely enclosed within the cover member when the cover member is installed on the hitch pin.

The cover member includes an inwardly directed, resilient annular collar 52 which is located within the opening. The annular collar 52 is formed integrally with the sidewall 51 and projects inwardly from the sidewall. The annular collar 52 is adapted to be received in a reduced diameter portion 54 of the hitch pin when the cover member is installed on the hitch pin. The vertical thickness of the collar 52 corresponds to the length of the reduced diameter portion of the hitch pin 30. The annular collar 52 is sufficiently resilient as to flex or deform downwardly as the cover member is being forced upwardly onto the hitch pin, during installation of the cover member on the hitch pin. This permits the hitch pin to pass into the opening. When the hitch pin becomes seated in the opening in the position illustrated in FIG. 2, for example, the annular collar 52 restores to its original shape filling the reduced diameter portion of the hitch pin as illustrated in FIG. 2. The annular collar 52 serves to retain the cover member 40 on the hitch pin 30, but permits the cover member to be removed when sufficient downward force is applied to the cover member as to again distort the annular collar and allow the cover member to be drawn off the hitch pin.

Referring to FIGS. 2 and 3, when the cover member 40 is installed on the hitch pin, the cover member underlies the bottom surface 32 of the hitch pin support 28 with the peripheral portion 46 of the cover member located beyond the front surface 33 and beyond the side surfaces 34 and 35 of the hitch pin support. The hitch pin 30 is contained within the cover member, spaced inwardly from the lower surface 44 of the cover member. Consequently, the cover member prevents direct contact with the hitch pin and the hitch pin support, thereby cushioning a blow from accidental contact with the hitch pin support 28 and/or the hitch pin 30.

The hitch cover 10 has a vertical thickness that is substantial enough to prevent injury to an individual, such as a child, when moving within the area 22 beneath the hitch pin support of the camper trailer by preventing direct contact with the hitch pin.

In this embodiment, the cover member 40 comprises a one-piece element which is made of foam rubber. However, the cover member can be made of other resilient materials, such as sponge or rubber, for example. The dimensions of the cover member 40 are selected so that the cover member 40 covers the hitch pin and the hitch pin support and in the exemplary embodiment, the hitch cover 10 is approximately sixteen inches in diameter and six inches thick. However, the cover member can have other dimensions and can be rectangular or cylindrical in shape or be any other solid geometric shape that provides a barrier between the hinge portion 12 and an individual moving beneath the overhang portion.

Figure 6:
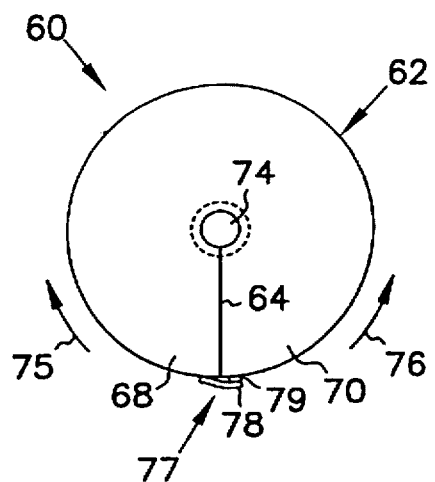
FIG. 6 is a top plan view of a further embodiment of the hitch cover.
Figure 7:
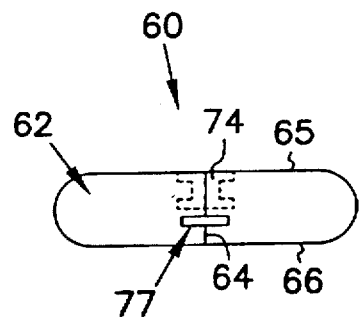
FIG. 7 is a side view of the hitch cover of FIG. 6.

Referring now to FIGS. 6 and 7, in accordance with a further embodiment of the invention, a hitch cover 60 includes a cover member 62 having a slit 64 formed therethrough from the upper surface 65 to the lower surface 66, defining engaging end portions 68 and 70 that facilitate mounting of the hitch cover 60 on the hitch pin. The slit 64 extends from the upper surface 65 to the lower surface 66 over approximately one-half the diameter of the cover member 62. The end portions 68 and 70 are normally in engagement with one another as illustrated in FIGS. 6 and 7. The end portions are relatively movable out of engagement with one another by grasping the cover member 62 on opposite sides of the slit 64 and moving the end portions 68 and 70 in the directions of the arrows 75 and 76, respectively. This exposes the opening 74 to permit the cover member to be placed on the hitch pin. When released, the end portions restore to the engaging condition shown in FIG. 6.

After the hitch cover 60 has been installed on the hitch pin, the two end portions 68 and 70 are held together by a suitable fastener 77 that releaseably secures the two end portions together for maintaining the cover member on the hitch pin. By way of example, the fastener 77 can be hook and loop type fastener which includes a hook type material 78 secured to the cover member at end portion 68 and a loop type material 79 secured to the cover member at end portion 70.

Figure 8:
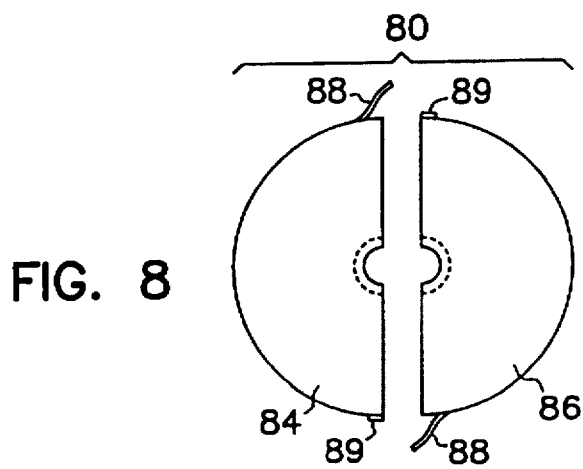
FIG. 8 is a front plan view of another embodiment of the hitch cover.

Referring to FIG. 8, in another embodiment of the invention, a hitch cover 80 includes a cover member having two cover member portions 84 and 86. The cover portions 84 and 86 are secured together by a securing means, of the type that quickly releases, such as one or more hook and loop type fastener devices, including hook type material 88 on one cover portion and loop type material 89 on the other cover portion, for maintaining the cover member 80 on a hitch pin. The cover portions 84 and 86 can be identical to one another so that two such cover members form the hitch cover 80, simplifying manufacture of the cover member because only one part has to be molded. In this embodiment, the hitch cover 80 is made out of sponge material.

Figure 9:
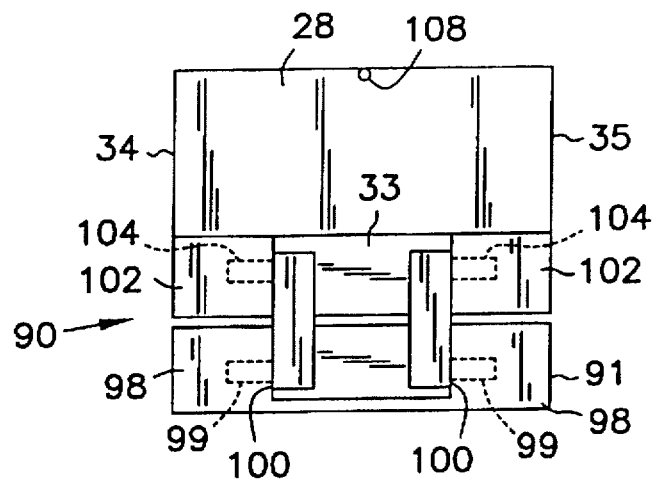
FIG. 9 is a side elevation view of the hitch pin support and with a further embodiment of a hitch cover installed on the hitch pin support and shown in its deployed position represented by the solid line, enclosing the hitch pin, and in its storage position, represented by the dashed line.
Figure 10:
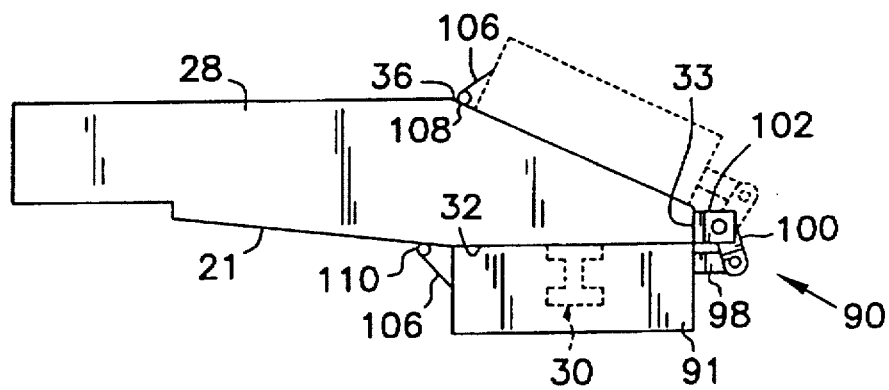
FIG. 10 is a side view of the hitch pin support and the hitch cover of FIG. 9; and, FIG. 11 is a top view of the hitch cover of FIG. 9.

Referring to FIGS. 9 and 10, in accordance with a further embodiment of the invention, a hitch cover 90 comprises a cover member 91 that is pivotally mounted on the hitch pin support 28 and is adapted to be moved between a storage position, represented by the dashed line in FIG. 10, in which the cover member 91 rests on the upper surface 36 of the hitch pin support 28, and a deployed position, represented by the solid line in FIG. 10, in which the cover member is located beneath the lower surface 32 of the hitch pin support and encloses the hitch pin 30.

Figure 11:
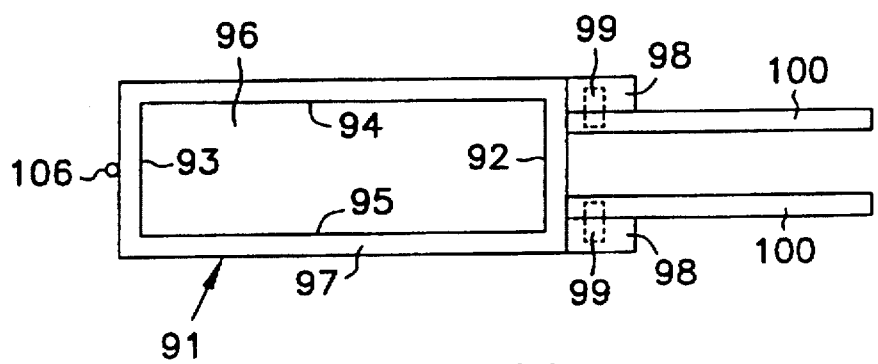

Referring additionally to FIG. 11, the cover member 91 is a pan-like member that is generally rectangular in shape. The cover member has a front wall 92, a rear wall 93, sides 94 and 95, and a bottom 96 which closes the cover member 91 at its lower end. The cover member is open at its upper end 97. The hitch cover 90 includes a hinge mechanism for pivotally securing the cover member to the hitch pin support. To this end, the cover member includes a pair of pivot mounts 98 on its front wall 92, each having a pivot portion 99 which pivotally mounts a link 100 at one end thereof, the other end of the link being pivotally secured to the hitch pin support 28 by a pivot mount 102, including pivot portion 104, which is provided on the front surface 33 of the hitch pin support 28. It is pointed out that the hinge mechanism that has been described is an example of one arrangement for mounting the cover member to the hitch pin support and that other mounting arrangements can be used for mounting the cover member to the hitch pin support and which provides for movement of the cover relative to the hitch pin support. In one embodiment, the cover member 91 is dimensioned so that the cover member lies between the sides 34 and 35 of the hitch pin support and extends from near the front 33 of the hitch pin support to the upwardly sloping surface 21 of the hitch pin support. By way of example, the width of the cover member 91 can be approximately eight inches to twelve inches and the length of the cover member can be approximately twelve inches. The height of the front, back and sides corresponds at least to the length of the hitch pin and preferably is slightly greater than the length of the hitch pin, and for example can be approximately three to five inches in height. The cover member can be made of any suitable material, including plastic, metal, such as steel or aluminum, or even of a soft material, such as foam rubber, or other resilient material.

The cover member 91 is maintained in the stored and deployed positions by suitable retaining mechanism, including a portion 106 on the cover member near the upper and lower edges thereof and portions 108 and 110 on the upper surface 36 and the lower surface 32, respectively, of the hitch pin support 28. By way of example, the retaining mechanism can include spring clips, recesses, or apertured flanges, formed on the cover member which receive catch devices, or screws or bolts, provided on the hitch pin support, snap fasteners carried on tabs, hook and loop type fasteners, or any other suitable retaining mechanism. Also, when the cover member is made of a metal such as steel, for example, magnetic catches can be used.

Thus, it has been shown that the present invention provides a hitch cover for preventing injury to individuals moving within the area below the overhang portion of a fifth-wheel type camper trailer and in which the hitch portion of the camper trailer is located. In one embodiment, the hitch cover includes a cover member of an oversized solid one-piece foam rubber construction having a blind hole in the top surface for receiving therein the depending hitch pin. The cover member has an outside diameter substantial enough to extend radially outward beyond the front and sides of the hitch pin support, thus preventing direct contact with the hitch pin and the hitch pin support by an individual, such as a child, by cushioning a blow from accidental contact with either the hitch pin and/or the hitch pin support. Although in the preferred embodiments the cover member is a solid member made of a resilient material, the cover member can be an inflatable device made of plastic, rubber, or vinyl, for example, and formed to fit around the hitch pin and be secured thereto in the manner of the solid devices that have been described. Moreover, the cover member can be a pan-like member that is pivotally mounted to the hitch pin support and adapted for movement between a storage position and a deployed position in which the cover member encloses the hitch pin.

What is claimed is:

1. A hitch cover for a trailer hitch of the type that includes a hitch pin support and a hitch pin that depends from a bottom surface of the hitch pin support near a front surface of the hitch pin support, the hitch pin having a reduced dimension portion, the hitch pin support having first and second side surfaces, said hitch cover comprising:

a cover member of a soft, resilient material, said cover member having an upper surface and a lower surface, and a peripheral edge portion which extends beyond both said front surface and said first and second side surfaces of the hitch pin support when said cover member is installed on the hitch pin in underlying relation with the bottom surface of the hitch pin support;

said cover member having an opening in said upper surface for receiving the hitch pin to permit said cover member to be installed on the hitch pin in underlying relation with said bottom surface, said opening in said cover member including a sidewall the inner dimension of which is less than the outer dimension of the hitch pin, and a resilient annular collar projecting inwardly from said sidewall into said opening, said annular collar being adapted to be received in said reduced dimension portion of the hitch pin when said cover member is installed on the hitch pin, and the depth of said opening being at least equal to the length of the hitch pin and less than the thickness of said cover member from said upper surface to said lower surface;

whereby when said cover member is installed on the hitch pin underlying said bottom surface of the hitch pin support, the hitch pin is contained within said cover member, spaced inwardly from said lower surface of said cover member, and said peripheral edge portion of said cover member is located beyond both said front surface and said first and second side surfaces of the hitch pin support to thereby cushion a blow from accidental contact with either one of the hitch pin and the hitch pin support.

2. The hitch cover according to claim 1, wherein said cover member is made of foam rubber.

3. The hitch cover according to claim 1, wherein said cover member is a solid element.

4. The hitch cover according to claim 3, wherein the depth of said opening corresponds to approximately one-half the thickness of said cover member between said upper and lower surfaces thereof.

5. The hitch cover according to claim 3, wherein said cover member comprises first and second cover member portions, and fastening means for releaseably fastening said first cover portion to said second cover portion when said cover member is installed on the hitch pin.

6. The hitch cover according to claim 5, wherein said fastening means comprises at least one hook and loop type fastener.

7. The hitch cover according to claim 1, wherein said cover member is generally toroidal in shape.

8. The hitch cover according to claim 7, wherein said cover member comprises a solid, one-piece element.

9. The hitch cover according to claim 8, wherein said cover member has a slit therein which extends from said upper surface to said lower surface and over approximately one-half the diameter of said cover member, defining first and second engaging end portions for said cover member, said first and second end portions being relatively movable out of engagement with one another to provide access to said opening to facilitate the mounting of said cover member on the hitch pin, and fastening means secured to said cover member for releaseably securing said first and second end portions together when said cover member is installed on the hitch pin.

10. A hitch cover for a trailer hitch of a fifth-wheel type trailer, the trailer hitch including a hitch pin support and a cylindrical hitch pin that depends from a bottom surface of the hitch pin support near a front surface of the hitch pin support, the hitch pin support having first and second side surfaces, said hitch cover comprising:

a cover member including a solid element made of a soft, resilient material, said cover member being generally toroidal in shape and having an upper surface, a lower surface, and a peripheral edge portion, said cover member having a cylindrical opening in said upper surface for receiving the hitch pin, said opening in said cover member having an inner diameter that is less than the outer diameter of the hitch pin; the depth of said opening being at least equal to the length of the hitch pin and less than the thickness of said cover member from said upper surface to said lower surface;

said cover member having an outer diameter that is greater than the length of said lower surface of the hitch pin support and greater than the width of said front surface of the hitch pin support, whereby when said cover member is installed on the hitch pin, the hitch pin is contained within said cover member, spaced inwardly from said lower surface of said cover member, and said cover member underlies said bottom surface of the hitch pin support with said peripheral edge portion of said cover member located beyond both said front surface and said first and second side surfaces of the hitch pin support to thereby cushion a blow from accidental contact with either one of the hitch pin and the hitch pin support.

11. The hitch cover according to claim 10, wherein the hitch pin is cylindrical in shape and has a reduced diameter portion, and wherein said cover member has an inwardly directed annular collar portion formed on the inner surface of said opening and which is adapted to be received in said reduced diameter portion of the hitch pin when said cover member is installed on the hitch pin.

12. The hitch cover according to claim 10, wherein said cover member is made of foam rubber.

13. The hitch cover according to claim 10, wherein said cover member comprises a one-piece element.

14. The hitch cover according to claim 13, wherein said cover member comprises first and second cover member portions, and fastening means for releaseably fastening said first cover member portion to said second cover member portion when said cover member is been installed on the hitch pin.

15. The hitch cover according to claim 14, wherein said fastening means comprises at least one hook and loop type fastener.

16. The hitch cover according to claim 13, wherein said cover member has a slit therein which extends from said upper surface to said lower surface and over approximately one-half the diameter of said cover member, defining first and second engaging end portions for said cover member, said first and second end portions being relatively movable out of engagement with one another to provide access to said opening to facilitate the mounting of said cover member on the hitch pin.

17. The hitch cover according to claim 16, and including fastening means secured to said cover member for releaseably securing together said first and second end portions.

* * * * *